Jan. 4, 1955

C. F. PULVARI

FERRO-ELECTRIC CARRIER, PARTICULARLY TAPE RECORDING AND REPRODUCING SYSTEM

Filed Jan. 24, 1951

2,698,928

INVENTOR

CHARLES F. PULVARI

BY [signature]

PATENT AGENT

United States Patent Office 2,698,928

Patented Jan. 4, 1955

2,698,928

FERRO-ELECTRIC CARRIER, PARTICULARLY TAPE RECORDING AND REPRODUCING SYSTEM

Charles F. Pulvari, Washington, D. C.

Application January 24, 1951, Serial No. 207,515

27 Claims. (Cl. 340—173)

The present invention relates to the electrostatic recording and reproducing system or apparatus in which a smaller or larger number of signals representing the information or intelligence to be "stored" can be recorded and subsequently reproduced after a shorter or larger period of time has elapsed since the recording. Devices of this kind handling information of the binary digit "yes" or "no" type or modulation of electric signals are called memory devices.

This application is a continuation-in-part of applicant's U. S. patent application, Serial No. 145,361, filed Feb. 21, 1950.

It is an object of the present invention to employ as dielectric materials between the conductive plates or layers of electric condensers or semi-conductors in a memory device substances with ferro-electric properties which can be easily polarized and depolarized or changed in their piezo-electric property under the action of electrostatic forces. Suitably said forces are obtained with the aid of electrons directed to and impinging upon the intelligence carrier containing such ferro-electric substances. Various materials may be used in this device as dielectric substances with ferro-electric properties, for example plastic materials having piezo-electric properties. Suitable materials for these dielectric layers are titanates, such as barium titanate ($BaTiO_3$) which may be mixed with other titanates. Small amount of materials may be added to and/or impurities may be present in the latter mixture. The properties of these titanates are described in:

"The Physical Review," January 1949, vol. 75, pp. 103–106 (Ferro Electric Barkhausen Effect in $BaTiO_3$), by R. R. Newton, A. I. Ahearn and K. G. McKay.

"Acta Crystallographica," April 1949, vol. 2, pp. 90–93 (Domain Orientation in Polycrystalline $BaTiO_3$), by G. C. Danielson.

"The Physical Review," December 1948, vol. 74, pp. 1622–1636 (Theoretical Model for Barium Titanate), by W. P. Mason and B. T. Matthias.

"The Physical Review," November 1948, vol 74, pp. 1134–1147 (Electrostrictive Effect in Barium Titanate Ceramics), by W. Mason.

These substances are merely examples of polarizable and piezo-electric materials adapted as dielectric according to the invention. Other dielectric substances with ferro-electric, i. e., piezo-electric properties may be employed as dielectric in the inventive structures.

It is a further object of the present invention to employ in a tape recording apparatus, a tape comprising a flexible band, on or in which dielectric particles with ferro-electric properties are provided, said particles being adapted to be readily polarized and depolarized or changed in their piezo-electric property under the action of electrostatic forces. Suitably, said forces are obtained or applied by means of knife-like electrodes, or with the aid of electrons directed to and impinging upon the tape or by the electrodes of condensers formed thereon or a combination of these means. The information may be recorded on said tape by using as electrostatic forces modulated high-frequency or an electron beam modulated by modulated high-frequency signals.

It is a further and important object of the present invention to provide a dielectric, slightly or semi-conductive material as a storage medium between the conductive plates or layers of an intelligence carrier, said material consisting of or containing ferro-electric substances having such property that portions of said intelligence carrier can be spontaneously and independently remanently polarized or depolarized or changed in their piezo-electric property, when said intelligence carrier is acted upon, whereupon the bits of information can be reproduced by detecting the polarized or depolarized or changed piezo-electric property conditions in this intelligence carrier in the same sequence as they were acted upon during the recording.

Still other objects of the invention are suitable methods of operating the new recording and reproducing apparatus.

Other objects of the invention are electric and auxiliary devices to be associated with the new recording and reproducing apparatus, including a cathode ray tube scanning system for successively influencing said ferro-electric intelligence carrier to record information therein and to detect the electric conditions in the same sequence during the reproducing and means to preorient the storage medium by applying a voltage across the intelligence carrier prior to the recording.

Other and further objects of the present invention will be more fully understood by reference to the following description and the accompanying drawings, illustrating preferred embodiments thereof, wherein.

Figure 2:
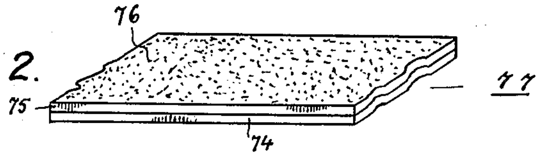
Fig. 2 is a perspective view, on an enlarged scale, of a fragment of the flexible strip or tape used in the apparatus of Fig. 1.
Figures 1, 3, 4:
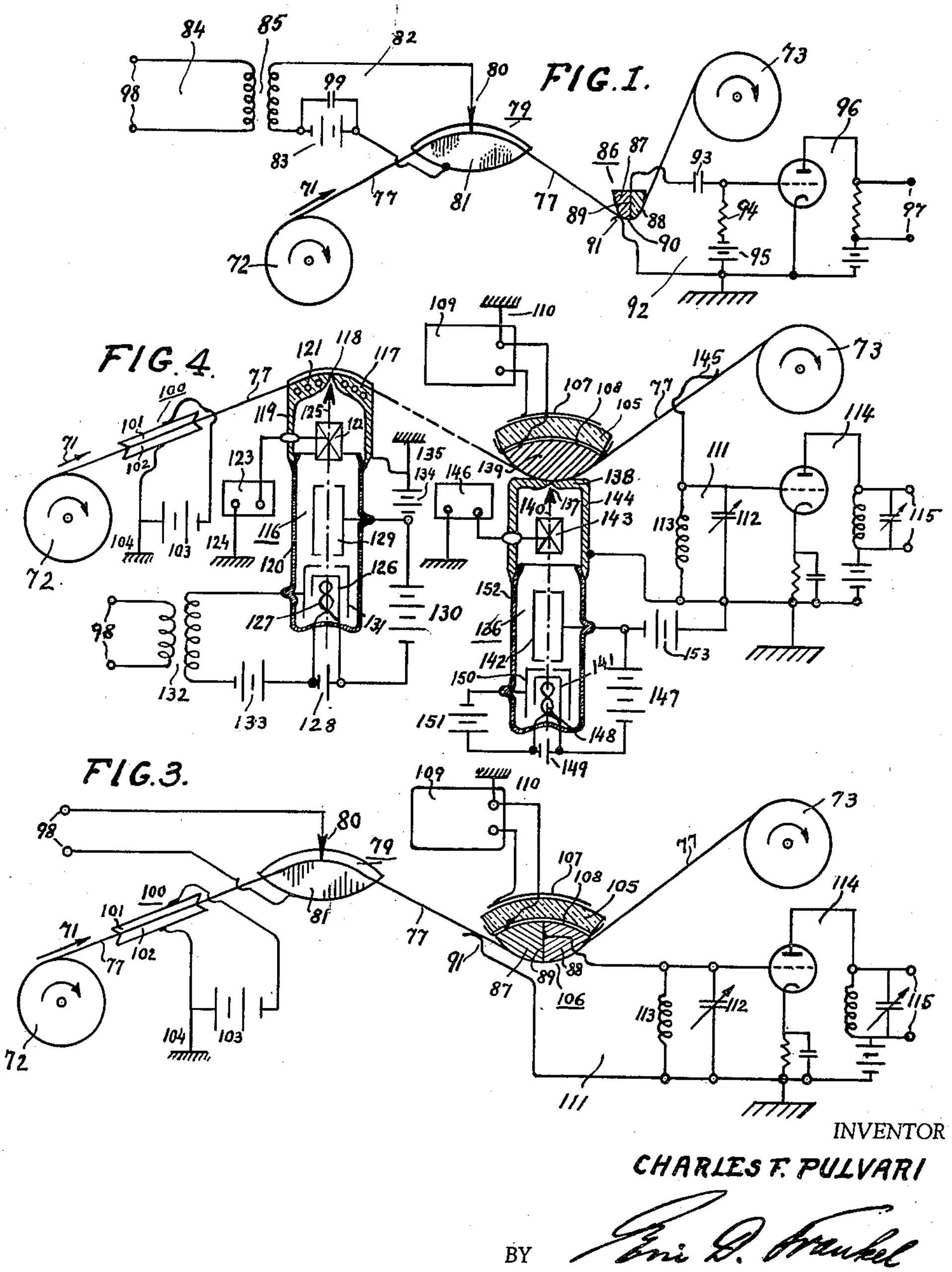
Fig. 1 is a diagrammatic view of an embodiment of the invention, in which the dielectric material is embodied in a flexible strip or tape, including the circuit.
Figs. 3 and 4 show diagrammatic views of further embodiments of the present invention according to Fig. 1, including the circuits.

Fig. 1 shows an embodiment of the invention, in which the carrier of the information is made in form of a flexible wire, tape or band 77 running in the direction 71 from one reel 72 to another 73 while being scanned in a manner similar as in the known magnetic tape recorders. As shown in Fig. 2, the tape 77 comprises a continuous conductive metal band, film or foil 74, to which a coating 75 of ferro-electric, i. e. piezo-electric material is applied. The coating 75 may be made of a suitable insulating or slightly conductive material in which ferro-electric, i. e. piezo-electric substances are incorporated, for example, as filler materials.

The coating 75 is covered by a great number of tiny, conductive or metallic particles 76 applied to or deposited on said coating, for example, by an evaporation or printing process. These particles 76 are electrically insulated from one another due to their mechanical separation. A great number of individual condensers is obtained in this manner.

The tape 77 passes on its way from the reel 72 to the reel 73 through a gate 79, i. e. between a pair of contacts 80 and 81 forming part of an electric circuit 82 supplied by a suitable source of current, such as a battery 83. A condenser 99 across said battery serves to lower the high-frequency impedance of this battery. While the upper knife-shaped contact 80 is arranged opposite the layer of tiny metal particles 76 on the top of the tape 77, the lower contact 81 is made wider, the tape 77 with its bottom layer or metal film 74 engaging the upper surface of said contact 81. The ferro-electric, i. e. piezo-electric material of the tiny individual condensers can be prepolarized or preoriented prior to the recording step, for example, by passing or running the whole length of tape 77 through the gate 79, whereby said individual condensers are electrostatically acted upon by the potential of the battery 83. Due to the knife structure of the contact 80 several of the tiny condensers are simultaneously and electrostatically connected in the circuit at any particular time, when the tape 77 passes in front of said contact 80, i. e. these small condensers located in one line across the width of the tape 77 are momentarily electrostatically shunted by the knife 80. While the tape 77 with its metallic bottom layer 74 is firmly supported on and by the contact 81, the contact 80 is arranged in such a manner that it engages said tape rather slightly. The knife 80 may be spaced a very small distance from the tape 77.

During the recording step the tape 77 may be heated, for example, by thermostatically-controlled electric heating means, not shown, built in or associated with the body of contact 81 or being mounted in the immediate neighborhood of said contact. The thermostat of said heating means is set so as to heat the tape 77 within the gate 79 to a temperature below the Curie or transition point of the piezo-electric material. The tiny, individual condensers of the tape 77 are acted upon, while said tape runs through the gate 79 at a uniform speed, by an electrostatic D. C., A. C., modulated A. C. or pulsed fields directed, in case of D. C. or pulses, against the field represented by the preoriented dielectric or polarized piezo-electric material in said tiny condensers. The A. C. or modulation circuit is designated by 84 and is coupled with the circuit 82 by means of a transformer 85. The signal or impulse source to be connected with said circuit 84 at its input terminals 98 is not shown in the drawing. During the recording of the intelligence, the electric field representing the signals applied to the tape switches the ferro-electric particles therein, i. e. establishes a polarization pattern along the tape in accordance with the intelligence to be recorded.

A simple apparatus is used to reproduce the signals from the tape 77. The tape 77 is guided over an arcuate edge having a relatively small radius so that the tape 77 is sharply bent when passing over said edge. In Fig. 1 this edge is the lower surface of a stationary member 86 of round shape comprising two symmetrical insulating pieces 87 and 88 holding between them an extremely thin conductive or metal layer 89, such as a metallic coating deposited on one of the adjacent straight sides of said pieces. A very fine line of contact with the upper side of the tape 77 covered with the tiny metal particles 76 is obtained in this manner at 90. A contact 91 is provided to engage the lower or conductive layer 74 of the tape 77, preferably somewhat in front of the place of engagement between the contact at 90 and the upper side of the tape 77. These contacts are part of the reproducing input circuit 92, including as main elements a coupling condenser 93, an input resistor 94 and a battery 95. This input circuit is connected to an amplifier circuit 96, to the output terminals 97 of which a loudspeaker, a television tube or any other transducer circuit is to be connected. As a result of mechanical stresses due to the relatively sharp bending of the tape 77 in front of the upper contact at 90, charges are obtained in the individual condensers of the tape as in the individual condensers of the multicondenser structures of the foregoing embodiments. The reproducing step carried out by means of the circuits 92, 96 and the transducer to be associated therewith is a reverse operation of the recording step, i. e. the ferro-electric particles or the polarization pattern produce charges in accordance with the recorded intelligence to be detected in the reproducing apparatus. The reproducing step may be repeated many times. To obliterate the signals in the individual condensers of the tape 77, it is merely necessary to heat the latter above the Curie or transition point, for example, by running said tape through the gate 79 maintained at such temperature, whereupon the tape 77 is ready for reuse, i. e., recording.

The tape 77 may be made without the tiny metal or conductive particles 76, in which case the knife-shaped contact piece 80 and the lower edge of the thin metal layer 89 act as that part of the individual condensers during the preorienting and the recording steps, which said tiny particles 76 had before. It may also be possible to use a tape 77 without metal layer 74. The stationary contacts 81 and 91 may be spaced from the tape 77 rather than actually engaging it, whereby said contacts act as condenser plates.

As in the foregoing embodiments, the recording step with the apparatus in Fig. 1 may be carried out without prepolarization. In this case, the ferro-electric material has to be rendered uniform in its intra- and intermolecular structure by heating the material above the Curie or transition temperature, for example, within the gate 79, whereby the tape may be additionally exposed to high frequency or supersonic oscillations. The latter may be produced by a generator, not shown in the drawing, to be coupled with the circuit 82 through the transformer 85.

Fig. 3 shows an embodiment of the invention in which the charges are obtained by applying ultrasonic oscillations to the ferro-electric tape.

In this embodiment, the recording step can be carried out in principally the same manner as in Fig. 1. The recording part of the apparatus of Fig. 3 is a slight modification of the recording part of Fig. 1, said modification being not essential for the reproducing operation. While in the apparatus of Fig. 1 no special device for the prepolarizing step is shown, a condenser 100 with plates 101 and 102 is provided in Fig. 3 in front of the gate 79, the tape 77 passing between said two plates. As this condenser 100 is connected to a source of voltage, such as a battery 103, one side of which is preferably grounded at 104, the ferro-electric layer of the tape 77 is prepolarized during the recording operation, before it passes through the gate 79. A modulated high-frequency current containing the information to be recorded is applied to the input terminals 98 directly connecting to the contacts 80 and 81 of the gate 79 and produces a polarization pattern in the prepolarized tape 77 during the recording step. By reversing this operation, it is possible to read out the intelligence carrier.

In the reproducing part of the apparatus of Fig. 3, the tape 77 is subjected to the action of ultrasonic, suitably focussed ultrasonic waves, which are produced in an arcuate member 105 of piezo-electric or ferro-electric material, such as barium titanate ($BaTiO_3$). This arcuate member 105 is mounted on an insulating member 106 of similar construction and functions as the stationary member 86 in Fig. 1. The upper contour of this member 106 is arcuate to fit exactly that of the piezo-electric or ferro-electric member 105. Armatures 107 and 108 on the arcuate member 105 are connected to a generator 109 producing high-frequency waves of a suitable frequency, one terminal of this generator being grounded at 110. These waves are transmitted to the tape 77 via the member 106. Due to the arcuate shape of the member 105 the waves are focussed on the tape 77, i. e., the oscillations transmitted will primarily act on the tape 77 at the place where in contacts the thin metal layer 89 between the insulating pieces 87 and 88 which parts are the same as in Fig. 1. Due to the ultrasonic oscillations acting on the tape 77 at the place of contact with the metal layer 89, mechanical stresses are caused in this tape which stresses result in charges of the ferro-electric material in the tape 77 of the same frequency as the ultrasonic waves. These charges are similar to those obtained by the sharp bending of the tape 77 in Fig. 1. They are detected via a tuned input resonance circuit 111, including as a condenser 112 in parallel with an inductance 113, and an amplifier circuit 114, connected to this input resonance circuit 111, with the aid of a transducer to be connected to the output terminals 115 of this amplifier circuit 114. The functions of these circuits and their operation are similar to those of radio receivers.

A further development of the tape recording and reproducing apparatus according to the invention is shown in Fig. 4. In this embodiment the prepolarizing step is carried out in the same manner and by the same means as in the apparatus of Fig. 3.

A cathode ray tube 116 is used to record the information on or in the tape 77 which is passed in front of a front wall 117 of said tube having an aperture slot or Lenard type window 118, which may be of aluminum. The front portion 119 of the tube 116 is suitably made of metal, which is sealed to the rear tube portion 120 of glass. Heating means 121 may be provided in the front wall 117 to heat the tape 77 to a temperature below the transition or Curie point of the piezo-electric or ferro-electric material incorporated in the tape 77. This temperature is maintained by thermostatic means, not shown in Fig. 4, in a manner known per se. A deflection plate 122 in the tube 116 energized by a deflection generator 123 grounded at 124 permits the recording of signals or pictures across the width of the tape 77 moving in front of the window 118, as an electron beam 125 generated by a cathode 126 in the tube 116 and projected through said window is deflected by said deflection plate 122. The cathode 126 is heated by means of the filament 127 supplied with current from a battery 128. The electron beam 125 is accelerated and focussed by the action of an anode 129 which is placed at a positive potential with respect to the cathode 126 by means of a voltage source or battery 130. The cathode ray beam 125 is modulated by means of a modulating element 131 which is connected in circuit with the cathode 126 and the secondary of an input transformer 132. A voltage source or battery 133 in this circuit furnishes the proper bias for the modulation. The front portion 119 of the tube 116 serves as second accelerating and focussing member and is positively biased with respect to the anode 129 by a suitable voltage source, such as the battery 134, grounded at 135. Due to the high velocity of the electron beam 125 modulated as described, A. C. charged electrons pass through the window 118 and apply A. C. charges to the tape 77 moving in front of said window. These charges contain the information to be recorded. The switching action of the modulated electron beam 125 causes a polarization pattern on or in the previously uniformly prepolarized moving tape 77, said pattern being proportional with respect to the signals or information to be recorded thereon.

The reproducing step may be carried out by means of a cathode ray tube 136 which is similar to the recording cathode ray tube 116. The tape 77 passes in front of a window 137 in the front end wall 138 of said tube 136 and may be acted upon i. e., subjected to mechanical stresses caused by ultrasonic oscillations produced by the arcuate member 105 which is the same as that in the apparatus of Fig. 3. The energy for the oscillations is derived from the same kind of generator 109 as in Fig. 3. An arcuate member 139 fitting exactly the arch of said member 105 and being in contact with the tape 77 transmits the ultrasonic oscillations to this tape 77, i. e., the member 139 is located opposite this window 137 at a small distance therefrom, so that only a narrow gap is left through which the tape 77 passes. Due to the shape of the members 105 and 139 the oscillations are focussed on the tape 77 exactly at the place in front of the window 137. When an electron beam 140 produced in the tube 136 by a cathode 141 accelerated and focussed by an anode 142 and deflected for scanning under the action of a deflection plate 143 principally in the same manner as in the recording cathode ray tube 116 is projected through the window 137, the charges on or in the piezo-electric or ferro-electric layer of the tape 77, obtained by the switching action of the impinging electron beam are detected via the input circuit 111 which includes the front portion 144 of the reproducing cathode ray tube 136, the moving tape 77, and a stationary contact brush 145 engaging said tape. The signals in this input circuit 111 are obtained by continuous switching of the ferro-electric particles in the tape 77 under the action of the electron beam 140 projected on this tape when moving past the window 137. The other elements of the input circuit 111 and associated circuits are the same as those in Fig. 3 and the operation of these circuits is principally the same as those in Fig. 3. The deflection plate 143 of tube 136 is energized by a deflection generator 146, operating in the same way as the deflection generator 123 of the recording tube 116. A voltage source, such as battery 147, serves to place the anode 142 at a positive potential with respect to the cathode 141. A filament 148 to heat said cathode 141 is supplied by a current from a battery 149. A grid 150 near the cathode 141, adapted to control the electron beam 140, is biased by a voltage from the battery 151. The rear portion 152 of the cathode ray tube 136 is made of glass, as that of the recording cathode ray tube 116, and sealed to the metal front portion 144. A voltage source, such as battery 153, between the front portion 144 and the anode 142 serves as second accelerating and focussing means for the electron beam 140.

The recording and reproducing means and circuits may be modified in any manner, as the invention obviously is not limited to the specific means and circuits and various changes thereof are possible within the scope of this invention. For example, the prepolarizing condensers 100 in Figs. 3 and 4, having smooth surfaces, between which the tape 77 passes, may be replaced by a condenser in which at least one of the condenser plates is a brush. The conductive bristles of this brush end is very fine tips, the points of which have a size comparable to that of the piezo-electric or ferro-electric grains in the layer of the tape 77, so that these bristles will be opposite said grains during the prepolarizing step, whereby an efficient prepolarizing operation is obtained. In place of brushes with bristles, a fine edge of a knife or blade may be provided across the tape 77 as armature. Several such blades spaced side by side may be employed. While in Figs. 3 and 4, batteries 103 supply uniform D. C. prepolarizing voltages, a pulsating D. C. voltage may be used in the prepolarizing step. This D. C. voltage is characterized by short, suitably extremely short, pulses of high voltage. The prepolarizing step may be carried out with the aid of an electron beam produced in a cathode ray tube similar to the tubes 116 or 136 shown in Fig. 4, said electron beam being directed to the tape 77 moving past its window and producing the polarization charges within the tape layer.

In all of the prepolarizing devices shown in the drawings and/or described in the forgoing, heating means may be provided at the tape 77 near the place where the tape layer is subjected to the prepolarizing charges, said heating means being adapted to heat the moving tape to a temperature below the Curie point and maintain said temperature.

It is possible to prepolarize the tape 77 in a separate device, not shown, in which case no prepolarizing condenser means 100, as shown in Figs. 3 and 4, or the like will be required in the recording apparatus itself. The tape 77 may be subjected to the prepolarizing charges while in wound condition.

While in the embodiment of Fig. 4, the tape 77 is subjected to mechanical stresses during the reproducing step, said stresses being caused by ultrasonic oscillations produced by the arcuate member 105, the reproducing operation, i. e. the inscribing of signals in the tape, could be carried out only by the action of the electron beam 140 of the cathode ray tube 136. In this case, the apparatus of Fig. 4 could be simplified by omitting the parts and circuit producing and controlling the ultrasonic oscillations acting on the tape 77 in front of the window 137 of the cathode ray tube 136. In this case, the reproducing operation is actually the reversal of the recording step and the same tube may be used for both operations.

In place of the cathode ray tubes, such as 116 and 136 in Fig. 4, ion guns may be employed to produce beams with charged particles, which are positively charged. These ion guns may also be used for the prepolarizing step.

Although in accordance with the provisions of the patent statutes this invention is described as embodied in concrete forms and the principle of the invention has been explained together with the best mode in which it is now contemplated applying that principle, it will be understood that the elements, combinations and methods shown and described are merely illustrative and that the invention is not limited thereto, since alterations and modifications will readily suggest themselves to persons skilled in the art without departing from the true spirit of the present invention or from the scope of the annexed claims.

I claim:

1. An intelligence carrier for electric recording apparatus of the type movable with respect to said recording apparatus, comprising a material, the intra- and intermolecular structure of which can be spontaneously and permanently remanent-changed according to the intelligence to be stored therein.

2. An intelligence carrier for electric recording apparatus of the type movable with respect to said recording apparatus, comprising a ferro-electric material as storage medium for the intelligence to be stored therein.

3. An intelligence carrier for electric recording apparatus of the type displaceable with respect to said recording apparatus, comprising an insulating material having electric dipoles, the spontaneous alignment of which caused by mutual interaction can be remanent-changed according to the intelligence signals to be stored therein.

4. An intelligence carrier for electric recording apparatus of the type displaceable with respect to said recording apparatus, comprising a semi-insulating material having electric dipoles, the spontaneously alignment of which caused by mutual interaction can be remanent-changed according to the intelligence signals to be stored therein.

5. A tape for tape recording apparatus comprising a ferro-electric layer, the intra- and intermolecular structure of which can be remanent changed in accordance with the intelligence to be stored therein.

6. A tape according to claim 5, wherein a conductive layer covers one surface of said ferro-electric layer.

7. A tape according to claim 5, wherein a great number of tiny conductive particles insulated from one another is uniformly distributed on and over at least one of the surfaces of said ferro-electric layer.

8. A tape according to claim 5, wherein in addition to said ferro-electric layer only insulating layers are provided.

9. An electric signal recording apparatus comprising in combination a recording medium having a ferro-electric layer adapted to be rendered uniformly in the alignment of its electric dipoles, signal-controlled means to energize said layer, means to move said medium past said energizing means, said energizing means being adapted to change said ferro-electric layer in and along said medium in its intra- and intermolecular structure in accordance with the signals transmitted to it by said energizing means.

10. An electric signal recording apparatus according to claim 9, a stationary device close to said energizing means being adapted to heat said ferro-electric layer to a temperature in the neighborhood of the Curie point of said layer and means associated with said heating device to maintain and control said temperature.

11. An electric signal reproducing apparatus adapted to reproduce the signals recorded in the medium by the recording apparatus according to claim 9, means to subject said medium to mechanical stresses, whereby electrical charges are produced in said ferro-electric layer, and means to detect said charges.

12. An electric signal reproducing apparatus adapted to reproduce the signals recorded in the medium by the recording apparatus according to claim 9, means to subject said medium to high-frequency oscillations, whereby electrical charges are produced in said ferro-electric layer, and means to detect said charges.

13. In a tape recording apparatus comprising a recording tape having a ferro-electric layer adapted to be rendered uniform in the alignment of its electric dipoles, means to prepolarize said tape layer, means to apply charges modulated by signals to be recorded in said ferro-electric layer, means to move said tape past said charging means, whereby a polarization pattern is obtained in said ferro-electric layer.

14. In a tape recording apparatus according to claim 13, wherein heating means are provided at the place of the charging means to heat said ferro-electric layer to a temperature near the transition temperature of said layer.

15. In a tape recording apparatus according to claim 13, wherein said charging means comprises condenser armatures between which said tape is passed during the prepolarizing step.

16. In a tape recording apparatus according to claim 13, wherein modulated high-frequency is used to apply said charges.

17. In a tape recording apparatus according to claim 13, wherein modulated high-frequency is used to produce said charges.

18. In a tape recording apparatus according to claim 13, wherein said charging means comprises an electrical device emitting charged particles.

19. In a tape recording apparatus according to claim 18, wherein a cathode ray tube is provided to emit electrons charging said ferro-electric layer.

20. In a tape recording apparatus according to claim 18, wherein an ion gun is provided to emit particles charging said ferro-electric layer.

21. In a tape reproducing apparatus comprising a recording tape having a ferro-electric layer adapted to be rendered uniform in the alignment of its electric dipoles, in which layer a polarization pattern containing the recorded signals is present, an electric device adapted to detect said signals of said pattern, means to move said tape past said detecting device and means to subject said ferro-electric layer to mechanical stresses at the place of said detecting means.

22. In a tape reproducing apparatus according to claim 21, wherein said means to stress said ferro-electric layer comprises a high-frequency oscillator adapted to subject said layer to high-frequency oscillations.

23. In a tape reproducing apparatus according to claim 21, wherein said electric detecting device includes at least one resonance and at least one amplifier circuit connecting to a transducer.

24. In a tape reproducing apparatus according to claim 21, wherein said electric detecting device comprises a cathode ray tube and a transducer circuit.

25. In a tape reproducing apparatus according to claim 21, said means to stress said ferro-electric layer comprising a curved guiding means adapted to stress said layer by bending said tape.

26. In a tape reproducing apparatus according to claim 21, said means to stress said ferro-electric layer comprising means to subject said layer to ultrasonic oscillations.

27. In a tape reproducing apparatus according to claim 26, wherein said means to subject said ferro-electric layer to ultrasonic oscillations comprises an ultrasonic generator and a piezo-electric element connected to said generator and adapted to act on said tape.

References Cited in the file of this patent

UNITED STATES PATENTS

| | | |
|---|---|---|
| 1,891,780 | Rutherford | Dec. 20, 1932 |
| 2,394,670 | Detrick | Feb. 12, 1946 |

FOREIGN PATENTS

| | | |
|---|---|---|
| 384,258 | Great Britain | Dec. 22, 1932 |
| 538,472 | Great Britain | Aug. 5, 1941 |